US008224567B2

(12) United States Patent
Dacosta

(10) Patent No.: US 8,224,567 B2
(45) Date of Patent: Jul. 17, 2012

(54) MAP-BASED BROWSER

(75) Inventor: Behram Mario Dacosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1019 days.

(21) Appl. No.: 11/519,400

(22) Filed: Sep. 11, 2006

(65) Prior Publication Data

US 2008/0065321 A1 Mar. 13, 2008

(51) Int. Cl.
*G01C 21/30* (2006.01)
*G05D 1/00* (2006.01)
(52) U.S. Cl. .......................... 701/409; 701/1
(58) Field of Classification Search .......... 701/208; 725/39, 40; 345/418
See application file for complete search history.

(56) References Cited

U.S. PATENT DOCUMENTS

| 5,671,342 | A  | * | 9/1997  | Millier et al. ................ 345/418 |
| 6,268,849 | B1 | * | 7/2001  | Boyer et al. ..................... 725/40 |
| 6,334,088 | B1 | * | 12/2001 | Taniguchi et al. ............ 701/431 |
| 2002/0054134 | A1 |   | 5/2002 | Kelts ............................. 345/788 |
| 2002/0112237 | A1 | * | 8/2002 | Kelts ............................... 725/39 |
| 2006/0080031 | A1 |   | 4/2006 | Cooper et al. ................ 701/208 |

FOREIGN PATENT DOCUMENTS
WO   WO 2006058371 A1   6/2006

OTHER PUBLICATIONS

HollywoodNorthReport (HNR) webiste printout, http://www.hollywoodnorthreport.com/regionalnews.php.
JumpTV, "JumpTV Info and Enterpreneurship by Tom Herman", website printout, http://www.publicdatasystems.com/JumpTV/JumpTV.html.
Elinor Mills, "Boob Tube Meets Online Maps as TV Fans Get Creative", CNET webiste printout http://news.com/Boob+tube+meets+online+maps+as+TV=Fans+get+creative/2100-1032_3-6045959.html.

* cited by examiner

*Primary Examiner* — Khoi Tran
*Assistant Examiner* — Ian Jen
(74) *Attorney, Agent, or Firm* — John L. Rogitz

(57) ABSTRACT

A map is presented by a browser, and breaking news content such as still photos, videos, etc. is placed on areas of the map to which the news pertains. A user can click on an area of the map for additional information, and can zoom in to a finer granularity. Personal content can also be displayed over map areas related to the personal content. The browser discovers locations to which content pertains in several ways, including by recognizing the name of a place in a story, through metadata, etc.

15 Claims, 2 Drawing Sheets

MAP-BASED BROWSER

FIELD OF THE INVENTION

The present invention relates generally to map-based browsers.

BACKGROUND

The news today is projected as a product of either local, state or national importance. As recognized herein, a user-driven news selection currently is not incorporated for geographic context onto a map. No visual information can be gathered by the viewer other than where the event of importance is occurring or has occurred in that specific county, state or region. With news presented in such a manner, the viewer is channeled towards a specific area and facet of the news. The viewer is not presented with any options and the content of any specific regions is not covered.

SUMMARY OF THE INVENTION

A display assembly includes a video monitor and a processor that associates data with a related geographic location. The processor displays a map on the monitor and superimposes content related to the data over the geographic location on the map.

The assembly can be embodied by, e.g., a computer or a TV. The data, which can be, e.g., a news story, can be received from a broadcaster or from the Internet, and the content can includes video or a still photo. Or, the data can be personal, such as a user video. If desired, the user can define a time period and only content representing data associated with the user-defined time period is displayed on the map.

In another aspect, a method for indicating to a user a location of a news event includes determining, using metadata accompanying data representing the news event, a geographic location related to the news event. The method also includes superimposing content representing the news event on a map on a monitor, with the content being superimposed on the map at the geographic location.

In yet another aspect, a system includes a processor and a monitor communicating with the processor. Logic is executable by the processor for superimposing content on a map that is displayed on the monitor, with the content being superimposed at locations corresponding to the content.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
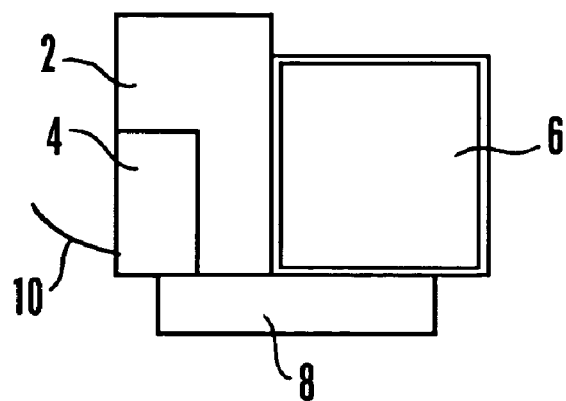
FIG. 1 is a block diagram of a system in accordance with present principles.

Referring initially to FIG. 1, a system is shown that includes a computer 2 with a processor 4 connected to a display screen or monitor 6. An additional form of input, such as a keyboard 8, may be a part of the system. It is to be understood that the present system is not limited to computers per se but rather may be implemented by any display device having a processor, such as a television.

Regardless of whether the system is implemented by a computer or a television, it can be connected to an external source of data, e.g., to an Internet connection 10. Other non-limiting forms of connection to an outside source of information may be cable, satellite, telco, etc.

Figure 2:
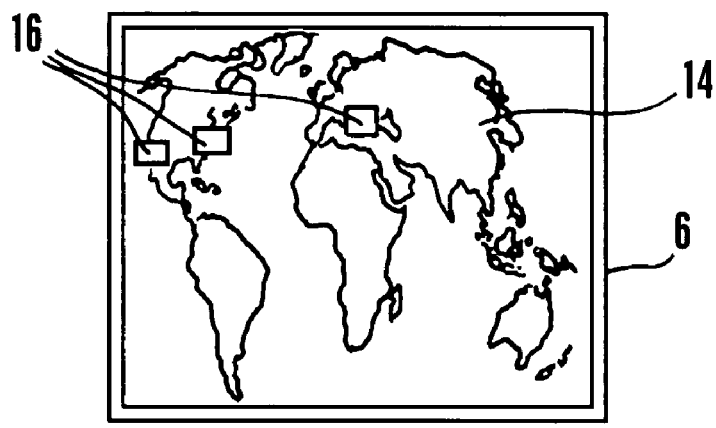
FIG. 2 is a screen shot of a map presentation on the display of FIG. 1.

Moving to FIG. 2, the monitor 6 displays a content browser in the form of a world map 14 that may be projected flat (Mercator) as a default screen. If the user chooses to view news-related data, content representing a world news event is superimposed over the geographic area 16 of the world map 14 that corresponds to the news event. At any one time, there may be more than one area 16 of the map 14 that corresponds to a news event, as FIG. 2 illustrates. The content displayed in the areas 16 on the world map may be, but are not necessarily limited to, a small window of streaming live video. The content alternatively may be thumbnails of still images, video, text, etc.

In any case, the user may select an option in which some or all content that is keyed to a geographic area 16 of the map 14 is related to a user-chosen topic, or person, rather than to the news. The content displayed on the map, in this case, is related directly to the chosen topic. Furthermore, the user may specify a time window for news or events, e.g., only news events in the last 24 hours are to be represented by associated content on the map 14.

Any of the content in the areas 16 may be selected (by means of, e.g., a pointing and clicking device) and viewed on a larger scale. Alternatively, a region of the map 14 may be selected and viewed in higher resolution, which potentially could result in additional content being superimposed onto related geographic regions, now shown in larger scale.

Figure 3:
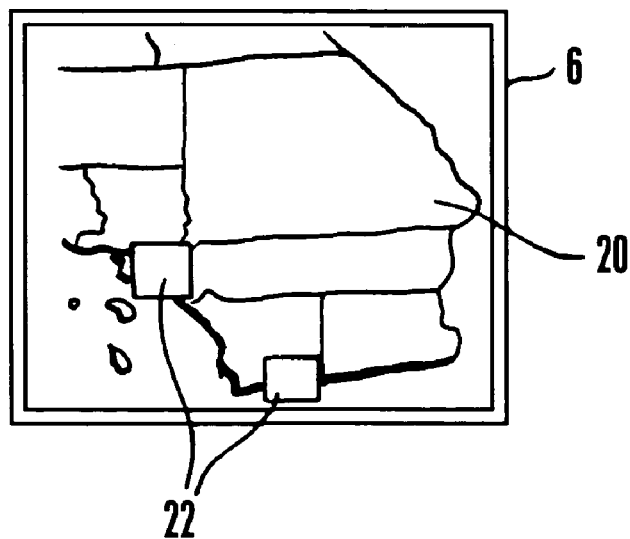
FIG. 3 is a screen shot of another map presentation on the display of FIG. 1.

Specifically and now referring to FIG. 3, the monitor 6 can show a magnified, higher resolution map 20 of an area 16 selected from the world map 14 shown in FIG. 2. On the display screen or monitor 6, some areas 22 may display primary news video related to the geographic areas over which the content is superimposed. The areas 22 in turn may be selected and viewed on a still larger scale or other regions of the map 20 may in turn be selected and viewed in higher resolution.

In addition to the above, the user may choose to view pre-stored content that does not involve the news transmitted via the Internet or any other connection methods. The content pre-stored on a local device may be on-demand content including Internet-based content, content from blogs, etc. The user may also view locally stored personal content, such as pictures or movies taken by family or friends. This personal content may be viewed simultaneously to the news content. Like news content, personal content is superimposed over geographic regions on the map to which the personal content pertains.

Figure 4:
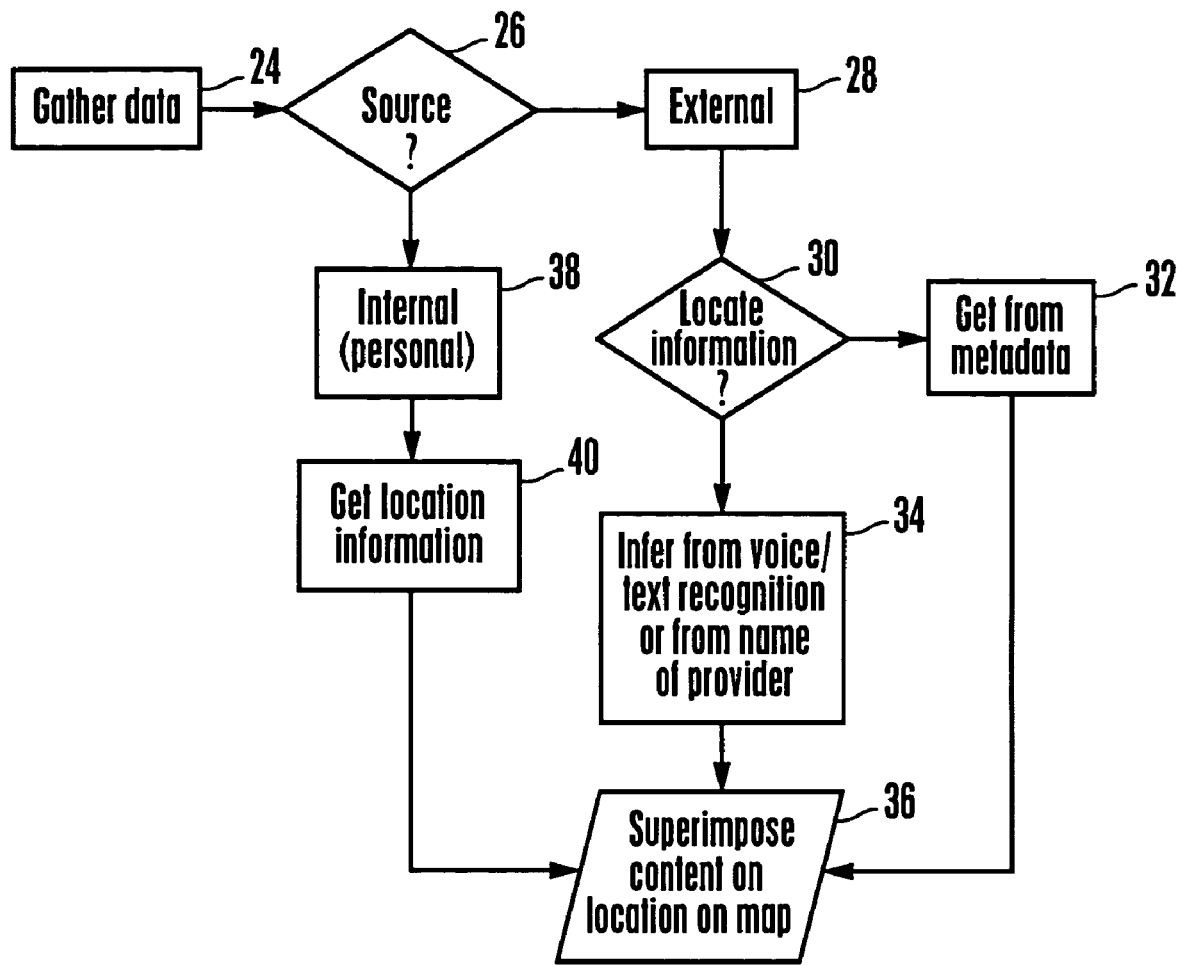
FIG. 4 is a flow chart of non-limiting logic for linking content to locations on the maps shown in FIGS. 2 and 3.

Now referring to FIG. 4 to understand how content is keyed to geographic areas, starting at block 24, data is gathered in order to be displayed on the map. The type of data, as defined by its original source, is determined as shown by decision diamond 26. If the data is being received from an external source, represented by block 28, the corresponding location of the data must be decided upon, as in decision diamond 30. Moving to block 32, the location information may be explicitly found in metadata in the data either in terms of location name (city, state, country) or in terms of Global Positioning System or other terrestrial coordinates.

Or, at block 34 location information pertaining to the data may be inferred. One way of inferring the location is from the name of the content provider, which may be associated with a specific geographic region. Another way to infer which geographic area corresponds to the data is by voice-to-text recognition. Specifically, the audio of the data can be converted to text which can be examined for location information. Still another mode of inferring location is through image recognition, in which the image of the video carries information that is keyed to a geographic location. Regardless of whether it is explicitly located in metadata or inferred, once the location corresponding to the data is determined, content derived from the data is then superimposed on the location on the map, discovered as disclosed above, in the browser window at block 36 in accordance with previous disclosure.

If, on the other hand, the data that is to be displayed on the map does not originate from an external source, but from personal content taken, e.g., in the form of still pictures or video, the logic branches from decision diamond 26 to block 38, which represents the personal data. Moving to block 40, location information is obtained as above, and in addition or alternatively, the device, such as a camera, that recorded the personal data may record the location, as well as time, of the recording or picture at the time of recording. This may be done by using Global Positioning System coordinates that are gathered by a GPS device on the camera. Also, the user of the recording device may textually or verbally identify the location at the time of recording. Once the location information is pre-stored, content representing the data is superimposed over the corresponding area of the map at block 36.

As stated above, the user may decide to view all content associated with a specific event, e.g., "earthquake", or a specific person, e.g., Kofi Annan. Using pre-stored information regarding Kofi Annan, either using identification data delivered by an Internet web site or a broadcaster, or with training assistance from the user together with pattern recognition algorithms operating on face/body/gait and including audio context information if available (with audio context being speech recognized as being spoken by Kofi Annan, or audio in which the words "Kofi Annan" are mentioned), the television browser presents content related to Kofi Annan superimposed on regions of the world map that are appropriate for the related story.

In addition to the geographic representation of content, event times may be represented. For example, the viewer may request content for "Kofi Annan" in May 2005. In this case, the map of the world is shown in the background, while in a corner the time can increment in hourly or daily increments while events in which Kofi Annan appears at that same corresponding time are shown at appropriate locations on the map. This technique may also be used to view personal content.

Time information may be obtained using the timestamp of the original recorded content from, e.g., the filename, information associated with the filename, or metadata associated with the content. These timestamps are normally recorded with the contents by the recording equipment (e.g. digital still camera, video camera, etc.) Alternative methods include: the timestamp of delivery of content to the user may be used as a backup, or image recognition of dates that may appear in the video can be obtained, or voice-to-text conversions of spoken dates and times can be used.

While the particular MAP-BASED BROWSER is herein shown and described in detail, it is to be understood that the subject matter which is encompassed by the present invention is limited only by the claims.

What is claimed is:

1. A display assembly comprising:
    a video monitor; and
    a processor executing logic comprising:
        associating data with a related geographic location;
        displaying a map on the monitor; and
        superimposing content related by virtue of geographic location on the Earth to the data over the geographic location on the map, such that content is displayed on the map according to geography not genre, the content including a video or still photo.

2. The assembly of claim 1, wherein the assembly is embodied by a computer.

3. The assembly of claim 1, wherein the assembly is embodied by a TV.

4. The assembly of claim 1, wherein the data is received from a broadcaster or from the Internet.

5. The assembly of claim 1, wherein the data is a news story.

6. The assembly of claim 1, wherein the data is a personal video.

7. The assembly of claim 1, wherein only content representing data associated with a user-defined time period is displayed on the map.

8. A method for indicating to a user a location of a news event, comprising:
    determining, using metadata accompanying data representing the news event, a geographic location related to the news event; and
    superimposing textual content describing the news event on a map on a monitor, the content being superimposed on the map at the geographic location.

9. A system comprising:
    at least one processor;
    at least one monitor communicating with the processor; and
    logic executable by the processor for superimposing content on a map that is displayed on the monitor, the content being superimposed at geographic locations on the map corresponding to the content, wherein a geographic location for content is inferred from a name of a provider of the content, and/or by voice-to-text recognition.

10. The system of claim 9, wherein the system is embodied by a computer.

11. The system of claim 9, wherein the system is embodied by a TV.

12. The system of claim 9, wherein the content is received from a broadcaster or from the Internet, and the content superimposed on the map includes video or a still photo.

13. The system of claim 9, wherein the content is a news story.

14. The system of claim 9, wherein the content is a personal video.

15. The system of claim 9, wherein only content representing data associated with a user-defined time period is displayed on the map.

* * * * *

UNITED STATES PATENT AND TRADEMARK OFFICE
CERTIFICATE OF CORRECTION

PATENT NO. : 8,224,567 B2  
APPLICATION NO. : 11/519400  
DATED : July 17, 2012  
INVENTOR(S) : DaCosta Page 1 of 1

It is certified that error appears in the above-identified patent and that said Letters Patent is hereby corrected as shown below:

In the Claims:

Claim 1, Col. 4, line 11, between the words "of" and "geographic", insert the word -- the --.
Claim 1, Col. 4, line 13, between the words "that" and "content", insert the word -- the --.
Claim 1, Col. 4, line 15, between the words "or" and "still", insert the word -- a --.
Claim 9, Col. 4, line 44, between the words "wherein" and "geographic", replace the word "a" with the word -- the --.
Claim 9, Col. 4, line 45, between the words "for" and "content", insert the word -- the --.
Claim 12, Col. 4, line 53, between the words "include" and "video", insert the word -- a --.

Signed and Sealed this
Eighteenth Day of June, 2013

Teresa Stanek Rea
*Acting Director of the United States Patent and Trademark Office*